United States Patent [19]
Barlow et al.

[11] Patent Number: 5,274,797
[45] Date of Patent: Dec. 28, 1993

[54] MULTIPROCESSOR SYSTEM WITH CENTRALIZED INITIALIZATION, TESTING AND MONITORING OF THE SYSTEM AND PROVIDING CENTRALIZED TIMING

[75] Inventors: George J. Barlow, Tewksbury; Elmer W. Carroll, Billerica, both of Mass.; James W. Keeley, Nashua; Wallace A. Martland, Amherst, both of N.H.; Victor M. Morganti, Lincoln, Mass.; Arthur Peters, Sudbury, Mass.; Richard C. Zelley, Billerica, Mass.

[73] Assignee: Bull HN Information Systems Inc., Billerica, Mass.

[21] Appl. No.: 377,785

[22] Filed: Jul. 6, 1989

Related U.S. Application Data

[63] Continuation of Ser. No. 869,164, May 30, 1986, abandoned.

[51] Int. Cl.$^5$ ............ G06F 11/30; G06F 15/16
[52] U.S. Cl. ............ 395/575; 395/200; 395/325; 395/650; 395/700; 395/750; 371/16.1; 371/16.3; 371/18; 364/DIG. 1; 364/228.7; 364/228.9; 364/229.2; 364/230; 364/264; 364/267; 364/267.9; 364/273.4; 364/280.2
[58] Field of Search ............ 364/200, 900, DIG. 1, 364/DIG. 2; 395/200, 325, 575, 650, 750, 700; 371/16.1, 16.3, 18, 19

[56] References Cited

U.S. PATENT DOCUMENTS

| | | | |
|---|---|---|---|
| 4,361,832 | 11/1982 | Cole | 340/825.55 |
| 4,412,286 | 10/1983 | O'Dowd et al. | 364/200 |
| 4,439,839 | 3/1984 | Kneib et al. | 364/900 |
| 4,445,174 | 4/1984 | Fletcher | 364/200 |
| 4,486,831 | 12/1984 | Wheatley et al. | 364/200 |
| 4,495,568 | 1/1985 | Gilbert et al. | 364/200 |
| 4,495,571 | 1/1985 | Staplin, Jr. et al. | 364/200 |
| 4,539,637 | 9/1985 | DeBruller | 364/200 |
| 4,543,626 | 9/1985 | Bean et al. | 364/200 |
| 4,543,628 | 9/1985 | Pomfret | 364/200 |
| 4,564,899 | 1/1986 | Holly et al. | 364/200 |
| 4,564,900 | 1/1986 | Smitt | 364/200 |
| 4,627,060 | 12/1986 | Huang et al. | 364/200 |
| 4,639,916 | 1/1987 | Boutterin et al. | 364/200 |
| 4,641,238 | 2/1987 | Kneib | 364/200 |
| 4,641,266 | 2/1987 | Walsh | 364/200 |
| 4,654,817 | 3/1987 | Dube et al. | 364/200 |
| 4,660,141 | 4/1987 | Ceccon et al. | 364/200 |
| 4,663,539 | 5/1987 | Sharp et al. | 364/200 |
| 4,665,482 | 5/1987 | Murray, Jr. et al. | 364/200 |
| 4,677,566 | 6/1987 | Whittaker et al. | 364/492 |
| 4,695,946 | 9/1987 | Andreasen et al. | 364/200 |
| 4,701,845 | 10/1987 | Andreasen et al. | 364/200 |
| 4,748,573 | 5/1988 | Sarandrea et al. | 364/900 |

Primary Examiner—Thomas C. Lee
Assistant Examiner—John C. Loomis
Attorney, Agent, or Firm—Gary D. Clapp; John S. Solakian

[57] ABSTRACT

A data processing unit includes a number of tightly coupled central subsystems, a number of peripheral subsystems, a main memory and a system management facility all coupled in common to a system bus. The system management unit has top priority on the system bus and includes centralized resources which provide apparatus for indicating the status of power and temperature, booting the subsystems, testing the subsystems, timing central subsystem functions, and allowing local and remote maintenance access to the subsystems. The system management facility receives commands from the central subsystem to read from and write into the timers as well as to read the status of the overall system. The system management facility generates special commands to the central subsystem to indicate when the timers have decremented to ZERO as well as special commands to aid in hardware and software debugging.

21 Claims, 6 Drawing Sheets

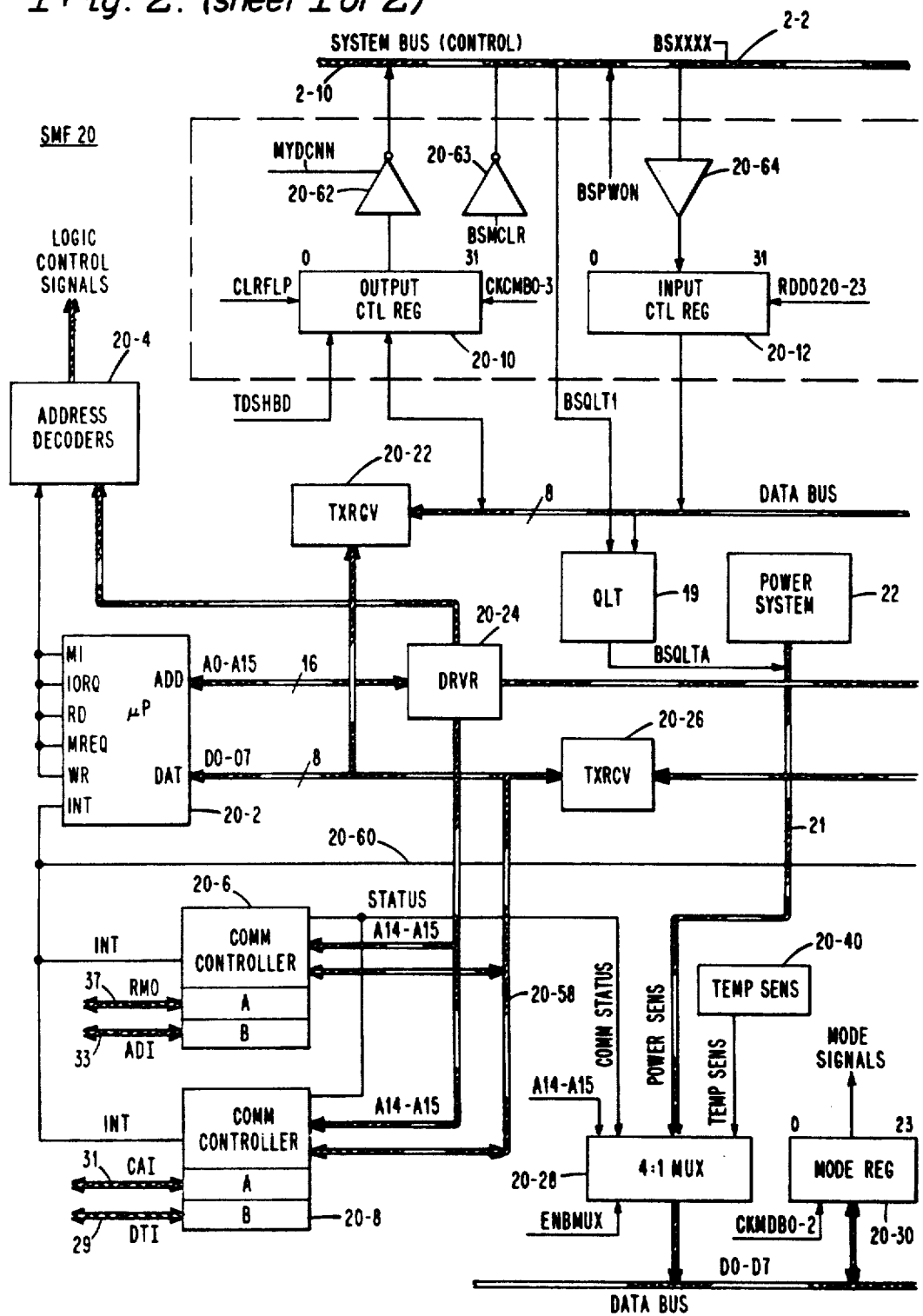
Fig. 2. (sheet 1 of 2)

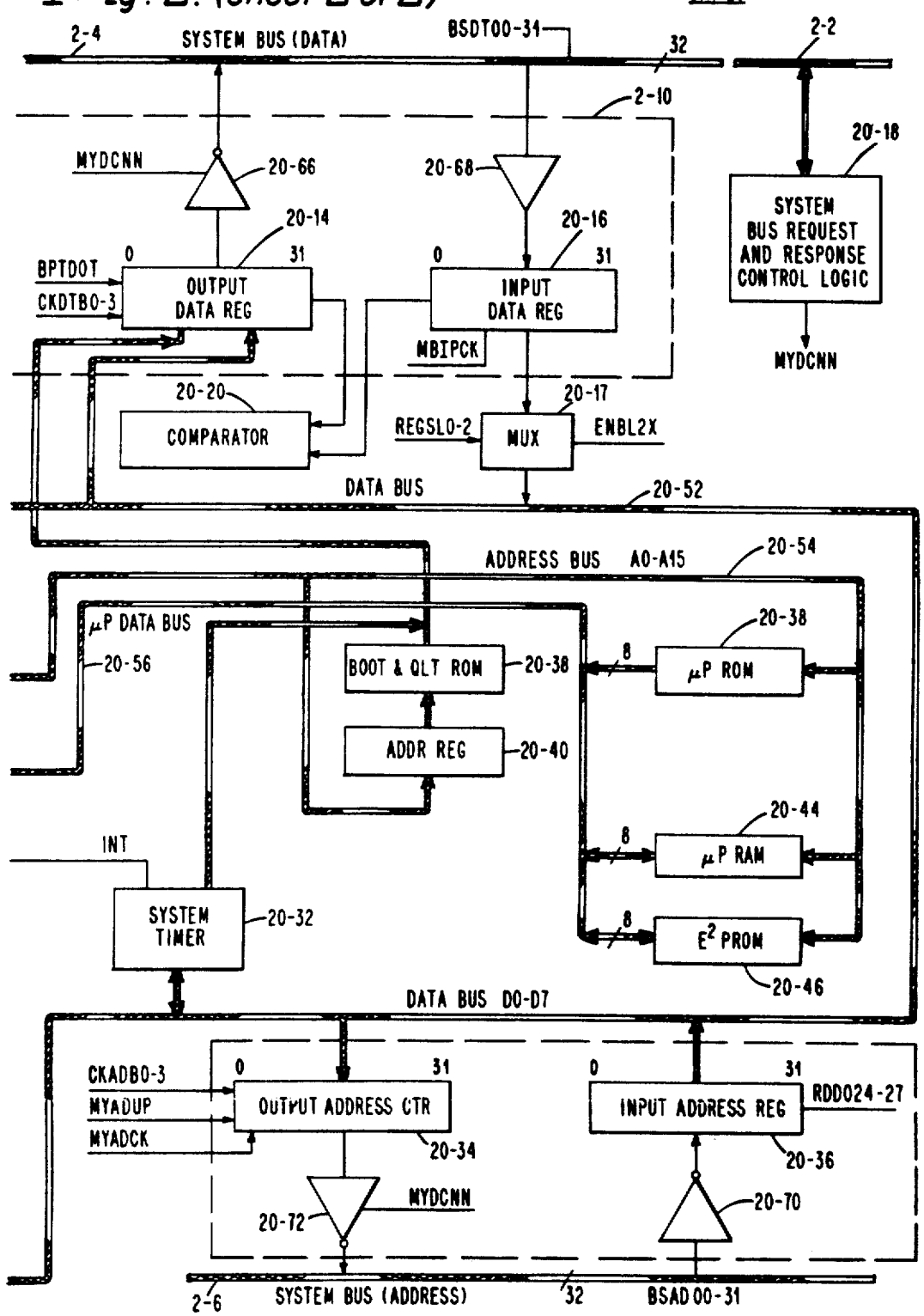
Fig. 2. (sheet 2 of 2)

Fig. 3.

FORMAT OF SMF → CPU COMMANDS AND RESPONSES

| CONTROL BUS 2-2 | | | | | | | | | ADDRESS BUS 2-6 BSAD | | | | DATA BUS 2-4 BSDT | | | |
|---|---|---|---|---|---|---|---|---|---|---|---|---|---|---|---|---|
| COMMAND / RESPONSE | BSSHBC | BSWRIT | BSLOCK | BSSHBC | BSDBPL | BSDBWD | BSBYTE | BSYELO | BSRINT | EXPANDED ADDR 24  31 | CPU REG ADDRESS 00  07 | DEST'N CHAN # 08 | FUNCTION CODE 18  23 | SOURCE CHAN # 00  09 | 10  15 | 16  23 | 24  31 |
| CPU QLT | 0 | 1 | 0 | 0 | 1 | 0 | 1 | 0 | 0 | | | ADDRESSED CPU CHAN # | 27 100111 | SMF CHAN # (0F)H | | | x |
| STOP CPU | 0 | 1 | 0 | 0 | 1 | 0 | 1 | 1 | | x... | x... | ALL ACTIVE CPU'S | 23 100011 | x... | | | x |
| STEP CPU | 0 | 1 | 0 | 0 | 1 | 0 | 1 | 1 | | x... | x... | ADDRESSED CPU CHAN # | 29 101001 | x... | | | x |
| RUN CPU | 0 | 1 | 0 | 0 | 1 | 0 | 1 | 1 | | x... | x... | ALL ACTIVE CPU'S | 2D 101101 | x... | | | x |
| WRC PRG | 0 | 1 | 0 | 0 | 1 | 0 | 1 | 1 | | x... | ADDR OF SELECTED CPU REG | ADDRESSED CPU'S CHAN # | 28 101011 | DATA (RIGHT JUSTIFIED) TO BE WRITTEN INTO CPU REGISTER | | | |
| CHANGE | 0 | 1 | 0 | 0 | 1 | 0 | 1 | x | | x... | ADDR OF SELECTED CPU REG | ADDRESSED CPU'S CHAN # | 25 100101 | 0... | | 0 24 | HH 31 |
| RDC PRG | 0 | 1 | 0 | 0 | 1 | 0 | 1 | 1 | | x... | ADDR OF SELECTED CPU REG | ADDRESSED CPU'S CHAN # | 20 100000 | SMF CHAN # (0F)H | x... | x | |
| SHBC READS | 0 | 1 | 0 | 0 | 1 | 0 | 1 | 1 | | x... | x... | (0)H (0F)H | 0...0, S,H,I | CONTENT OF SELECTED CPU REG (RIGHT JUSTIFIED) | | | |
| RTC INT | 0 | 1 | 0 | 0 | 1 | 0 | 1 | 1 | | x... | x... | CHAN # OF CPU WHICH LOADED RTC | 2F 101111 | SMF CHAN # 03C0 | x... | | |
| WDT INT | 0 | 1 | 0 | 0 | 1 | 0 | 1 | 1 | | x... | x... | CHAN # OF CPU WHICH LOADED WDT | 31 110001 | SMF CHAN # 03C0 | x... | | |
| STATUS CHANGE | 0 | 1 | 0 | 0 | 1 | 0 | 1 | 1 | | x... | x... | ALL ACTIVE CPU'S | 33 110011 | P T P Y Y F | ACTIVE CPU'S | | |
| NO-OP OFF-LINE | 0 | 1 | 0 | 0 | 1 | 0 | 1 | 1 | | x... | x... | ADDR. CPU CHAN # | 21 100001 | x... | | | x |
| SMF TO CP INTERRUPT | 0 | 1 | 0 | 0 | 1 | 0 | 1 | 1 | | x... | FUNCTION | ADDR. CPU CHAN # | 3F 111111 | | | | |

PF - POWER FAILURE
TY - TEMPERATURE YELLOW ERROR
PY - POWER YELLOW ERROR

Fig. 4.

MULTIPROCESSOR SYSTEM WITH CENTRALIZED INITIALIZATION, TESTING AND MONITORING OF THE SYSTEM AND PROVIDING CENTRALIZED TIMING

This is a continuation of co-pending application Ser. No. 06/869,164 filed on May 30, 1986, now abandoned.

RELATED APPLICATIONS

The following patent application, which is assigned to the same assignee as the instant application, has related subject matter: U.S. patent application entitled, "Apparatus and Method for Updating an Activity Timing Meter in a Data Processing System", with inventors James B. Geyer, Victor M. Morganti and Patrick E. Prange, and filed on an even date.

BACKGROUND OF THE INVENTION

1. Field of the Invention

This invention relates generally to the data processing field and more particularly to a system management facility directly coupled to a system bus and providing centralized resources for controlling the data processing unit which includes tightly coupled central subsystems.

2. Description of the Prior Art

Any data processing system includes a means for providing some external control of the system. A system having a single central processing unit would typically have a control panel with switches to turn power on and off, to boot the system and to set information into registers. The control panel would also have lights to indicate the power status and the contents of registers. Also included are usually a single cycle switch and a single instruction switch. Later systems provided a console cathode ray tube display terminal to provide these functions.

As the data processing requirements increased, dual processors were used. The operator panel or display terminal was coupled to one of the processors, which became a master. In the event of a problem with the master processor, another processor could become the master.

As the reliability of data processing systems improved, the user did not need the cost of dedicated personnel to debug hardware or software problems. Manufacturers therefore provided systems with a remote maintenance capability, that is, maintenance personnel could operate from a central site and communicate directly with data processing systems by transferring data over phone lines using modems at the data processing site and the central site. A typical system is described in the Honeywell Tacdial Remote Users Guide, order number VF16-01, May 1983. The typical system includes a number of central subsystems, a main memory and a number of peripheral controllers, all coupled in common to a system bus. Coupled directly to one of the central subsystems is a system control facility. Coupled to the system control adapter is a remote maintenance display terminal, a local display terminal and an auxiliary device, typically a logging printer.

The central subsystem to which the system control facility is coupled becomes the master. The master central subsystem receives all of the control information from the system control facility and communicates that control information to the other subsystems over the system bus.

The individual subsystems perform their quality logic tests (QLT) under control of the master central subsystem which in turn reports the results to the system control facility.

Each central subsystem also has a watch dog timer and a real time clock controlling the software procedures.

The coupling of the system control facility to the master central subsystem limits it as a maintenance tool since it is fully operational only if the master central subsystem is operating properly. Its ability to test for malfunctions in the master central subsystems is very limited.

Also, the system control facility cannot obtain access to the system bus quickly in case of a power alert, but rather, has to wait for the master central subsystem to access the bus. Since the master central system has lower priority than other subsystems, including memory subsystems and some peripheral subsystems, alerts may be delayed.

The overall system has the cost and overhead disadvantage of various kinds of resources being duplicated in separate subsystems. These resources include the system timers, the boot load and QLT control.

OBJECTS OF THE INVENTION

Accordingly, it is a primary object of the present invention to provide a more reliable data processing system.

It is another object of the invention to have a data processing system with a system management facility which is able to communicate directly with the subsystems coupled to the system bus.

It is another object of the invention to have a system management facility which is less costly.

SUMMARY OF THE INVENTION

A preferred embodiment of the data processing system of the present invention includes a number of subsystems and a system management facility (SMF), all coupled in common to a system bus. The SMF is coupled to the system bus in a position giving it the highest priority access to the system bus. The subsystems include a number of central subsystems and a main memory subsystem.

The SMF includes a microprocessing unit and a number of centralized resources which are accessible via the system bus through commands from the central subsystems (CSS). In the preferred embodiment, these centralized resources include system timer apparatus, power and temperature indication and sensing apparatus, system initialization means and system quality logic test (QLT) control apparatus. Operator access to the SMF takes place locally through a system display console and remotely through a remote maintenance display console.

The system is initialized by the SMF upon detecting through the power and temperature apparatus that the power voltage meets system requirements The SMF has software routines resident in storage associated therewith which verify under microprocessor control, the internal operation of the SMF and its ability to communicate with the system bus.

Upon verifying that it is operational, the SMF initializes the remaining subsystems through other software routines resident in storage which initiate the loading of the boot and QLT software routines into each central processing subsystem via the main memory subsystem.

During normal operation, the SMF may issue a number of special commands to any CSS. These special commands will have top priority on the system bus and will be recognized by the designated CSS. A number of these special commands relate to the system timer apparatus which provides a number of different timing facilities. These timing facilities include a real time clock, a watch dog timer and a time of day clock.

Each CSS is able to access all of these timing facilities by generating commands such as load watch dog timer, read watch dog timer, load real time clock, read real time clock, load time of day clock and read time of day clock. The SMF special commands such as a real time clock interrupt command and a watch dog timer interrupt command interrupts the CSS when the respective timer facility counts down to zero.

The SMF special commands include commands to a CSS to assist in maintenance and in software debugging. They include stop CPU, step CPU, run CPU, read CPU registers, write CPU registers, and a status change command. The status change command is used to alert a CSS of a power failure, a power alert or a temperature alert. This allows the CSS to take appropriate action including safe storing the contents of registers and shutting down in an orderly manner. The CSS may continue operation and print out a logging message on the SMF printer to alert maintenance personnel. Or, the CSS may ignore th power or temperature alert.

Upon detecting the occurrence of errors, the SMF may send a special command to instruct a CSS to perform its QLT.

Also, these special commands may be initiated by an operator from the system console or from the remote console when it has been properly activated, that is, the proper password was received by the SMF from the remote console.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which:

FIG. 2 shows a block diagram of the system management unit being coupled to the system bus.

FIG. 3 is a chart showing the central processor unit to system management facility commands and responses sent over the system bus.

FIG. 4 is a chart showing the system management facility to central processor unit commands and responses sent over the system bus.

DESCRIPTION OF THE PREFERRED EMBODIMENT

Figure 1:
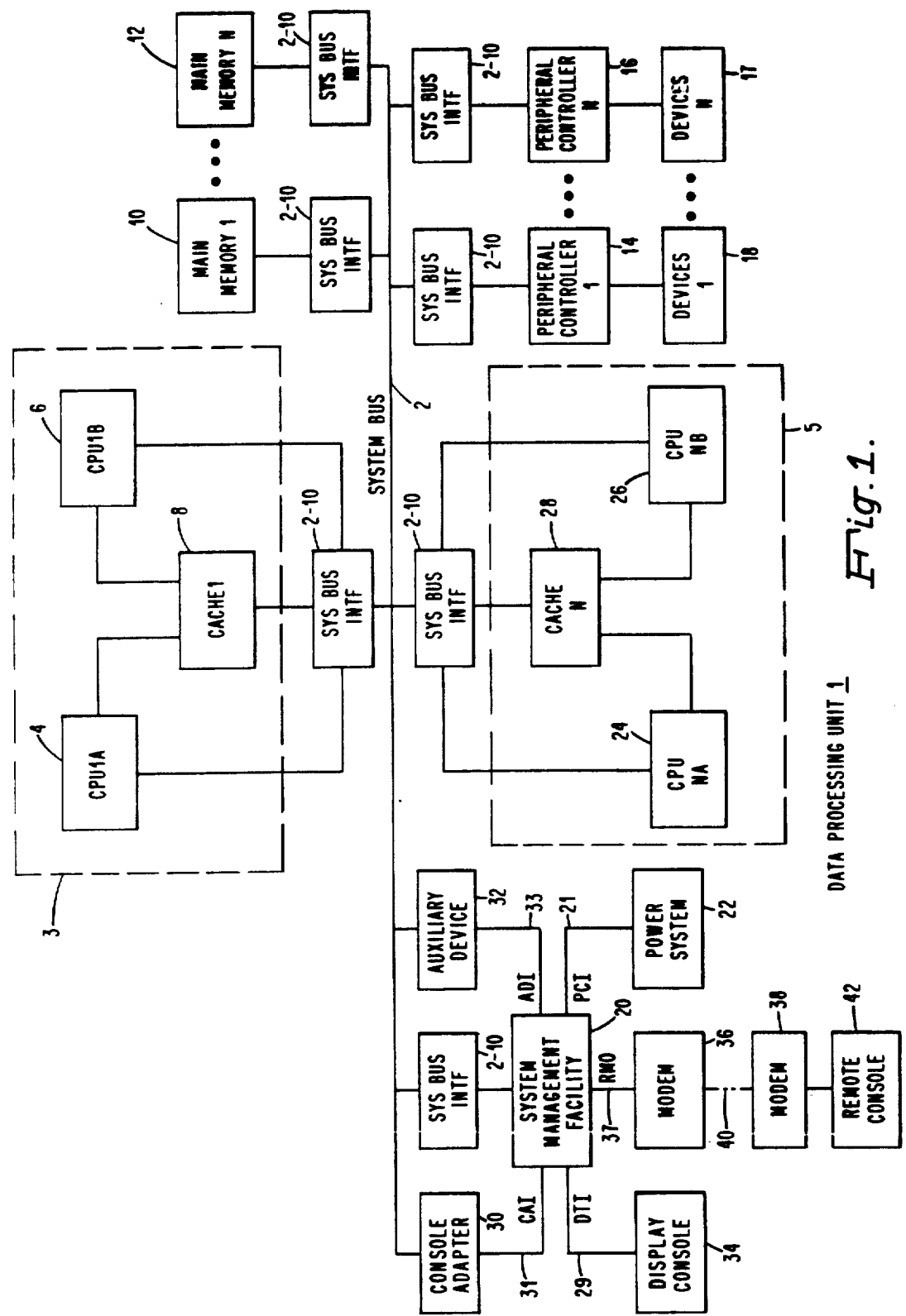
FIG. 1 shows a block diagram of the overall data processing unit including some detail of the connections to the systemm management facility.

FIG. 1 shows a tightly coupled multiprocessor data processing unit (DPU) 1 which includes a plurality of central subsystems (CSS) 3 through 5, a plurality of main memories 10 through 12, a plurality of peripheral controllers 14 through 16 and a system management facility (SMF) 20, all coupled in common to a system bus 2 via their respective system bus interface 2-10.

A plurality of devices 1 18 are coupled to peripheral controller 1 14 and a plurality of devices N 17 are coupled to peripheral controller N 16. The plurality of peripheral controllers 14 through 16 may include disk controllers, tape controllers, communication controllers and unit record controllers to which are coupled their respective disk drives, tape devices, communication lines, and unit record devices.

The organization of each of the plurality of CSS 3 through CSS 5 is the same. CSS 3 includes a central processor unit (CPU1A 4 and a CPU1B 6) both operating independently of each other with a cache 1 8 which is coupled to system bus 2. CSS 5 includes a CPUNA 24 and a CPUNB 26 both operating independently of each other with a cache N 28 which is coupled to system bus 2. CPUNA 24 and CPUNB 26 access main memory 10 through main memory 12 via cache N 28. CSS 3 through CSS 5 operate as tightly coupled multiprocessors since they execute a common operating system and share a common main memory.

Note that CPU1A 4 and CPU1B 6 are identified hereafter as CPU 4 and CPU 6. Similarly, CPUNA 24 and CPUNB 26 are identified as CPU 24 and CPU 26.

The SMF 20 provides for centralized control of DPU 1. This centralized control includes the initialization of the overall DPU 1 system, centralized control of the Quality Logic Test (QLT) operation, system timer centralization, and providing power supply and cabinet temperature alerts to the subsystems coupled to system bus 2. A number of control signals are provided between a power system 22 and SMF 20 via a power control interface (PCI) 21. Control signals from the power system 22 indicate to the SMF 20 the status of the DPU 1 power. Control signals from the SMF 20 to the power system 22 over PCI 21 specify the prescribed voltage margins at which the power system 22 should operate in order to test the DPU 1. The SMF 20 will run the QLT operation at the prescribed voltage margins to isolate and identify marginal logic elements.

A display console 34 allows an operator to communicate with DPU 1 via a display terminal interface (DTI) 29 to SMF 20. SMF 20 receives information from display console 34 and applies it to a system bus 2 via a console adapter interface (CAI) 31 and a console adapter 30. Information from DPU 1 is received by the display console 34 via system bus 2 console adapter 30, CAI 31, SMF 20 and DTI 29. Display console 34 is typically a Honeywell VIP 7300 terminal having a manual keyboard and a cathode ray tube (CRT) display. The CAI 31 and DTI 29 are typically RS232 RS422 communication interfaces.

The SMF 2 supports a remote maintenance capability. A remote console 42 may be an operator controlled display terminal or an unattended computer. The remote console 42 is connected to the SMF 20 via a MODEM 38, a communication line 40, a MODEM 36, and a remote maintenance option interface (RMO) 37. MODEMS 36 and 38 are typically RIXON MODEMS, for example, a T113C MODEM which originates calls at 300 baud, a T103J MODEM which originates and answers calls at 300 baud, and a T212A MODEM which originates and answers calls at 1200 baud.

The remote maintenance operation allows the remote site to resolve software and operational faults, to identify hardware faults, to send information such as software patches to the central DPU 1 system, and to provide back-up assistance to the on-site maintenance operation.

The SMF 20 will give access to the remote site access to the DPU 1 through SMF 20 to provide centralized control only if the proper password is received by the SMF 20.

An auxiliary device interface (ADI) 33, typically an RS232C interface, connects an auxiliary device 32 to the SMF 20. The auxiliary device 32 is typically a printer for logging status information or providing hard copy of the information displayed on the CRT of display console 34.

The SMF 20 during the DPU 1 start-up will initiate quality logic tests (QLT's) to assure that all the subsystems are coupled to the system bus 2 and are performing correctly. If the tests are unsuccessful, the SMF 20 signals power system 22 via PCI 21 to indicate the condition and also displays the error on the display console 34, remote console 42 and auxiliary device 32.

All of the subsystems bid for access to system bus 2 with the highest priority subsystem bidding gaining the access. Due to the requirement that the SMF 20 react quickly to certain real time system conditions, such as power fail detection, the SMF 20 is afforded highest priority to access system bus 2. FIG. 2 is a block diagram showing SMF 20 coupled to system bus 2. System bus 2 is shown as system bus (control) 2-2, system bus (data) 2-4 and system bus (address) 2-6. The system bus interface 2-10 generally operates as disclosed in U.S. Pat. No. 3,995,258 entitled, "Data Processing System Having a Data Integrity Technique" invented by George J. Barlow.

A microprocessor 20-2 controls the SMF 20/system bus 2 interface via software routines stored in a microprocessor programmable read only memory (PROM) 20-38. Microprocessor 20-2 is a Zilog Z80 CPU described in the Zilog Gold Book 1983/1984 microprocessor 20-2 is itself controlled by software stored in the microprocessor programmable read only memory (PROM) 20-38. Both the RAM 20-44 and the PROM 20-38 receive address signals A0 through A15 from microprocessor 20-2 over a 16 bit microprocessor address bus 20-54 via a driver 20-24. Data signals D0 through D7 are transferred between RAM 20-44 and microprocessor 20-2, and from PROM 20-38 via an 8-bit microprocessor data bus 20-56 and a transceiver 20-26.

When the SMF 20 has access to system bus 2, thirty-two data signals BSDT00-31 may be received by receivers 20-68 and stored in an input data register 20-16 from system data bus 2-4. Under microprocessor 20-2 control, the data is read from register 20-16 and stored in a location in RAM 20-44, 8 bits at a time via a multiplexer (MUX) 20-17, a data bus 20-52, a transceiver 20-22, transceiver 20-26 and data bus 20-56. Thirty-two address signals BSAD00-31 are received from system address bus 2-6 by receivers 20-70 and an input address register 20-36 and stored in locations in RAM 20-44, 8 bits at a time under microprocessor 20-2 control, and thirty-two control signals are received from system control bus 2-2 by receivers 20-64 and an input control register 20-12 and stored in locations in RAM 20-44, 8 bits at a time, in a similar manner as the data signals. Microprocessor 20-2 identifies the input registers 20-36, 20-16 and 20-12 as locations in RAM 20-44 and sends the appropriate address to RAM 20-44 via driver 20-44 and address bus 20-54. The input and output registers at the system bus interface 2-10 between CSS 3 through 5 and system bus 2 are similar to and perform the same functions as registers 20-10, 20-12, 20-14, 20-16, 20-34 and 20-36, which are included in system bus interface 2-10.

Microprocessor 20-2 initiates the loading of data signals BSDT00-31 into a 32 bit output data register 20-14 by addressing corresponding locations in RAM 20-44 and reading out data, 8 bits at a time. A 32 bit output address counter 20-34 is loaded with address signals BSAD00-31 by microprocessor 20-2 addressing corresponding locations in RAM 20-44 and reading out the address signals, 8 bits at a time. Similarly, a 32 bit output control register 20-10 is loaded with bus control information by microprocessor 20-2 addressing corresponding locations in RAM 20-44 and reading out control information, 8 bits at a time.

A boot and QLT ROM 20-39 stores test patterns and software test routines which are written into main memory 10 through 12. CSS 3 through 5 accesses these test patterns and software test routines to verify that the CSS 3 through 5 is operative. The ROM 20-39 is loaded directly into the output data register 20-14 under microprocessor 20-2 control. When the SMF 20 bids for and gains access to system bus 2, the information stored in output data register 20-14, output control register 20-10 and output address counter 20-34 is transferred to system bus 2 by drivers 20-66, 20-62 and 20-72 which are enabled by a my data cycle now signal MYDCNN.

System timers 20-32 provides centralized timing control of all subsystems and includes a real time clock, a watch dog timer and a time of day clock and a number of time outs.

The real time clock is loaded by a command from any CPU 4 through CPU 26 of CSS 3 through 5 with a value equal to the difference between the current time of day and the startup time of the process at the top of the Real Time Queue. When the current time of day equals the startup time, a real time clock interrupt signal is generated. This signal causes the SMF 20 to generate a command to interrupt the CPU which loaded the read time clock to alert the operating system to start the process at the top of the queue and to reload the real time clock for the next process. The maximum time span is approxiamtely 8.4 seconds.

The watch dog timer is used to protect the DPU 1 against certain software malfunctions which are manifested by a process running "too long". A command from any CPU 4 through CPU 26 loads the decrementing watch dog timer with a predetermined time. If the watch dog timer is not reloaded before it decrements to zero, an interrupt signal is generated causing the SMF 20 to generate a command to the CPU 4 through CPU 26 to alert the operating system that some process may be stuck in an infinite loop. The maximum time span is approximately 8.95 minutes.

The time of day clock is loaded from a battery backed-up real time calender and is incremented once every millisecond. The real time calendar stores in 12 binary coded decimal digits, the current year, current month, current date, day of the week, hour, minute and second.

The SMF 20 may operate as a master or a slave on system bus 2 operations. SMF 20 acts as a master when it initiates and sends commands to the other subsystems coupled to system bus 2. As a master, the SMF initiates general commands on system bus 2 to any subsystem and initiates special commands to CPU 4 through CPU 26.

SMF 20 acts as a slave when it receive an unsolicited command from any CPU 4 through CPU 26, and also when it receives an expected response from any of the other subsystems coupled to system bus 2.

SMF acts as both a master and a slave during a system bus 2 wraparound test operation wherein SMF 20 sends data out on system bus 2 as a master and receives the same data from system bus 2 a a slave. Referring to FIG. 2, during the wraparound test operation, 32 bits of data are loaded into output data register 20-14 from RAM 20-44. SMF 20 then issues a non memory system bus 2 request to itself. SMF 20 will recognize this request and connect to system bus 2 to transfer the contents of the output data register 20-14 to the input data register 20-16 via drivers 20-26, system data bus 2-4 and receivers 20-68. A comparator 20-20 checks that the contents of the two registers 20-14 and 20-16 are equal for correct operation.

SMF 20 generates commands to the other subsystems coupled to system bus 2 as standard commands with bus control signal BSYELO low. SMF 20 generates special commands to CPU1A 4 through CUUNB 26, with bus control signal BSYELO high and control signal BSMREF low indicating that the address signals represent a CPU channel address and a function code and not a memory 10 through 12 address.

System bus request and response control 20-18 includes three time-out circuits. If SMF 20 as the master requests access to system bus 2 and three microseconds pass with no response from the requested subsystem, the slave, then the system bus 2 cycle is terminated.

If one of the other subsystems as the master requests access to system bus 2 and there is no response from the slave within 5 microseconds, then the system bus 2 cycle is terminated.

If an SMF 20 read cycle is initiated and an expected system bus 2 reponse cycle (second half bus cycle) is not received in a millisecond, then the system bus 2 operation is terminated.

When the SMF 20 responds to a system bus 2 request as a slave, the SMF 20 generates either bus signals BSACKR to acknowledge the request, or BSNAKR to refuse the request.

The display console 34 is coupled to a communications controller 20-8 via the DTI interface 29. The communications controller 20-8 is coupled to system bus 2 via interface CAI 31 and the console adapter 30. This arrangement permits the SMF 20 to control the communication between the console and the DPU 1 system.

SMF 20 controls the remote maintenance via interface RMO 37 coupled to a communication controller 20-6. Communication controller 20-6 also controls the auxiliary device 32 via the ADI 33 interface. Communication controllers 20-6 and 20-8 are controlled by address signals A14 and A15 from microprocessor 20-2, driver 20-24 and address bus 20-60. Signal A14 selects channel A or channel B. Signal A15 causes either data or control information to be placed on the data bus 20-58 lines. Data or control information is transferred between microprocessor 20-2 and communication controllers 20-6 and 20-8 and data bus 20-58.

An operator writable $E^2$ PROM 20-46 stores information which includes a password to prevent unauthorized access via the remote maintenance interface; identifies the device storing boot software and also the main memory 10 through 12 locations into which the boot software is written for execution; control bits to indicate different QLT test functions to be performed by the DPU 1 system, and identifies which peripheral device stores the software to control CSS 3 through 5 and the main memory 10 through 12 locations into which this software is written.

A mode register 20-30 is coupled to data bus 20-52 and performs the following functions:
1. defines the SMF 20 diagnostic control of system bus 2 priority bits;
2. controls the up/down counting of output address counter 20-34;
3. enables comparator 20-20 to perform data system bus 2-4 comparisons;
4. control SMF 20 responses to CSS 3 through 5 commands; and
5. controls special system bus 2 operations during QLT and power up initialization.

Mode register 20-30 is written into and read by microprocessor 20-2 via transceiver 20-22 and data bus 20-52.

The mode register 20-30 is enabled by signal ENBLIX whose boolean equation is A8.A9.A10.A11.A0-.A1.A2.A3.A4.M1.MREQ. The mode register 20-30 clocking signals CKMDB0-2 are generated by the boolean expression $\overline{\text{ENBLIX}}$ . $\overline{\text{A12}}$ . WR . $\overline{\text{A13}}$ . (A14-.A15). For CKMDB0, $\overline{\text{A14}}.\overline{\text{A15}}$; for CKMDB1, A15-.$\overline{\text{A14}}$, and for CKMDB2, $\overline{\text{A14}}$.A15.

The power system 22 interface PCI 21 signals are received by SMF 20. These signals indicate a number of conditions.

A power ON/Fail signal SYSPWN indicates to the SMF 20 that the AC input voltage and the output logic voltages are within specifications. SMF 20 then starts the DPU 1 system initialization operations. If AC power is removed, the Power ON/Fail signal SYSPWN goes low. The output logic voltage, however, will remain within specification for three milliseconds giving the DPU 1 system time the shut down in an orderly manner to avoid losing data.

A power status signal PWRYLO indicates that all power supplies are performing to specification The power status signal going low indicates a non-operative power supply.

Power system 22 may include a battery backup power supply to keep the data in main memory 10 through 12 valid at all times. A memory valid signal BBUATV, if low, indicates that despite the battery backup power, th memory voltage went low and the information in main memory 10 through 12 may not be valid and memory reload is initiated.

A keylock signal from a switch on the power system 22 control panel initiates a panel locked signal to control an operator's access to the DPU 1 system functionality.

These signals received by the SMF 20 from the PCI 21 interface are applied to a multiplexer 20-28. Microprocessor 20-2 receives these signals via data bus 20-52 and tranceiver 20-22 to take appropriate action.

SMF 20 sends a power-on signal BSPWON out on system bus 2 to indicate to all subsystems coupled to the system bus 2 that power is within specification. Signal BSPWON going off gives all of the subsystems 3 milliseconds to "tidy up".

Also, the power on/fail signal SYSPWN going high during Power-On forces a master clear signal BSMCLR over system bus 2 via a driver 20-63 to reset all appropriate logic functions.

SMF 20 sends a number of signals to power system 20 over the PCI 21 interface. A high voltage output margin control signal HIMARG, and a low voltage output margin control signal LOMARG are generated by microprocessor 20-2 during test operations to vary the output margins on all power subsystems ±2%.

A system bus signal BSQLTI indicates that all other subsystems coupled to the system bus 2 are attached correctly, powered up and have successfully completed all test programs (QLT's). QLT logic 19 receives bus signal BSQLTI and a data signal from data bus 20-52 indicating that SMF 20 correctly performed its QLT and generates signal BSQLTA which is sent to power system 22 and interface 21 which indicates that the DPU 1 system is completely checked out. Signal BSQLTA is true whenever any unit is running its QLT on any QLT failure. BSQLTA is false whenever the QLT test is successful.

SMF 20 includes a temperature sensing device 20-40 to monitor the DPU 1 system cabinet temperature and generates a temperature high signal TMPYLO if the cabinet temperature is above the maximum temperature of 38° C. If the cabinet temperature goes abnormally high, a thermal sensor (not shown) will open, shutting down power. This causes the power on/fail signal SYSPWN to generate the system bus 2 signal BSPWON to indicate to all of the subsystems on system bus 2 to go into their respective power down sequences.

The temperature high signal TMPYLO is applied to MUX 20-28 to make it accessible to the microprocessor 20-2.

Signals from the communication controllers 20-6 and 20-8 are also applied to MUX 20-28 to allow the microprocessor 20-2 to sample the transmit data lines and also to detect when the receiving device is ready to receive the data.

MUX 20-28 is enabled by signal ENBMUX which is generated by the following boolean expression:

$$ENBMUX = A8 \cdot A9 \cdot \overline{A10} \cdot A11 \cdot \overline{ENMBOR} \cdot \overline{MI} \cdot \overline{MREQ}$$

wherein $$\overline{ENMBOR} = A0 \cdot A1 \cdot A2 \cdot \overline{A3} \cdot \overline{A4}$$

Signal MREQ is generated by microprocessor 20-2 to indicate that the address bus 20-54 does not contain a RAM 20-44 address. Signal MI is generated by microprocessor 20-2 to indicate that this is not an op code fetch operation.

Address bus 20-54 signals A14 and A15 select each of the four MUX 20-28 output signals.

The SMF 20 output registers, output data register 20-14, output control register 20-10 and output address counter 20-34 are coupled to system bus 2 (2-4, 2-2, 2-6) via inverting drivers 20-66, 20-62 and 20-72, respectively.

Data is put into these output registers a byte at a time from data bus 20-52. These output registers are addressed by microprocessor 20-2 as RAM 20-44 locations. Output data register 20-14 may also be loaded broadside from the system timer 20-32 or the Boot and QLT ROM 20-39. Also, an output address register 20-41 is loaded with successive addresses by microprocessor 20-2 for a block transfer of data to main memory 10 through 12.

Signals for loading the output registers are generated by decoding appropriate address lines and combining them with control signals from microprocessor 20-2. The logic showing the generation and checking of parity is not included in the specification since it is not pertinent to the invention, but it is obvious to one of ordinary skill in the art to understand that parity is checked after every byte transfer.

The output data register 20-14, not including parity, is made up of typically eight 74LS298 multiplexer registers with the "zero" input coupled to data bus 20-52 and the "one" input to the Boot and QFT ROM 20-39 output. The register 20-14 is loaded by logic in address decoders 20-4 as indicated by the following boolean expression:

An enable signal $ENBLOX = \overline{MI} \cdot MREQ \cdot A0 \cdot A1 \cdot \overline{A2} \cdot \overline{A3} \cdot \overline{A4} \cdot \overline{A8} \cdot \overline{A9} \cdot \overline{A10} \cdot \overline{A11}$ Note that all of the boolean expressions in the specification represent the logic of address decoders 20-4. The input signals to the address decoders are the address signals A0 through A15 and the microprocessor 20-2 signals MI, MREQ, IORQ, WR and RD. Address decoders 20-4 generate the logic control signals which control the SMF 20 logic elements.

The multiplexer registers 20-14 are loaded two at a time (a byte at a time) since each multiplexer register stores 4 bits, by clock signals CKDTB0, CKDTB1, CKDTB2 and CKDTB3.

$$CKDTB0 = ENBLOX \cdot A12 \cdot \overline{A13} \cdot \overline{A14} \cdot \overline{A15}$$

$$CKDTB1 = ENBLOX \cdot A12 \cdot \overline{A13} \cdot \overline{A14} \cdot A15$$

$$CKDTB2 = ENBLOX \cdot A12 \cdot \overline{A13} \cdot A14 \cdot \overline{A15}$$

$$CKDTB3 = ENBLOX \cdot A12 \cdot \overline{A13} \cdot A14 \cdot A15$$

Signal BPTDOT selects the output of ROM 20-39 or the output of system timers 20-32. The boolean expression for BPTDOT is:

$$(A8 \cdot A9 \cdot A10 \cdot A11 \cdot A12 \cdot A13 \cdot IORQ \cdot \overline{MI} + TODRWST)$$

Microprocessor 20-2 signals indicate the following. $\overline{MI}$ together with MREQ indicates that this is not an op code fetch operation. MREQ indicates that the address bus does not hold a valid address for a memory read or write operation.

$\overline{RD}$ indicates that microprocessor 20-2 wants to read data from memory or an I/O device. $\overline{WR}$ indicates that the microprocessor 20-2 data bus holds valid data for storage at the addressed memory location or I/O location.

IORQ . $\overline{MI}$ indicates that this isn't an input/output device address nor an op code fetch cycle of microprocessor 20-2. Signal TODRWT indicates a system timer 20-32 time of day transfer to system bus 2 via output data register 20-14.

For the broadside loading of output data register 20-14, a signal MYDTCK from system timer 20-32 indicating a time of day transfer or a microprocessor 20-2 generated signal BP2MDT generates clock signals CKDTB0 through CKDTB3 in parallel.

The boolean expression for signal BP2MDT is:

$$(A8 \cdot A9 \cdot A10 \cdot A11 \cdot A12 \cdot A12 \cdot A13 \cdot IORQ \cdot \overline{MI})$$

The output control register 20-10 is made up of typically two 74LS273 registers, a 74LS174 register and a 74LS374 register, all coupled to 8 bit data bus 20-52.

The control signals are clocked into the registers by signals CKCMB0 through CKCMB3, respectively. The boolean expressions are:

$$CKCMB0 = ENBLOX \cdot \overline{A12} \cdot \overline{A13} \cdot \overline{A14} \cdot \overline{A15}$$

$$CKCMB1 = ENBLOX \cdot \overline{A12} \cdot \overline{A13} \cdot \overline{A14} \cdot A15$$

$$CKCMB2 = ENBLOX \cdot \overline{A12} \cdot \overline{A13} \cdot A14 \cdot \overline{A15}$$

$$CKCMB3 = ENBLOX \cdot \overline{A12} \cdot \overline{A13} \cdot A14 \cdot A15$$

A signal TDSHBD disables the output of the 74LS374 register clocked by signal CKCMB0 during a time of day clock transfer. System reset signal CLRFLP resets the remaining three registers.

The 74LS374 register stores the eight command signals shown in FIG. 4. They are signals BSYELO, BSBYTE, BSDBPL, BSDBWD, BSSHBC, BSLOCK, BSWRIT and BSMREF. During the non time of day transfer, these bus signals are applied directly to driver 20-62.

The output address counter 20-34 includes four 74AS869 counters described in the Texas Instruments ALS/AS Logic Circuits Data Book 1983 (Advanced Low-Power Schottky/Advanced Schottley). The counters have four modes of operation: clear, decrement, load and increment A load counter's operation is initiated by signal MYADUP applied to the four counters and by signals CKADB0 through CKADB3 applied to the respective counter. The boolean expressions are:

$$CKADB0 = ENBLOX \cdot \overline{A12} \cdot A13 \cdot \overline{A14} \cdot \overline{A15}$$

$$CKADB1 = ENBLOX \cdot \overline{A12} \cdot A13 \cdot \overline{A14} \cdot A15$$

$$CKADB2 = ENBLOX \cdot \overline{A12} \cdot A13 \cdot A14 \cdot \overline{A15}$$

$$CKADB3 = ENBLOX \cdot \overline{A12} \cdot A13 \cdot A14 \cdot A15$$

Signal MYADUP is stored in the mode register 20-30 by microprocessor 20-2 to indicate a load or increment mode of operation. During a boot and QLT operation, the counters would be loaded initially a byte at a time, and then incremented in sequence with the address register 20-41 reading out the data from ROM 20-39 for transfer to the output data register 20-14.

A clock signal MYADCK is applied to a clock input terminal of each counter 20-34 to time the counter. Signal MYADCK is generated by a delayed acknowledge signal BSACKR.

The input data register 20-16 is made up of four 74S374 registers. The input address register 20-36 is made up of four 74LS374 registers and the input control register 20-12 is made up of two 74LS374 registers, a 74LS374 register and a 74AS823 register. The 74AS823 register receives the eight bus signals BSYELO, BSBYTE, BSDBPL, BSDBWD, BSSHBC, BSLOCK, BSWRIT and BSMREF that control the SMF 20 commands put out on system bus 2.

All of the above input registers 20-16, 20-36 and 20-12 are loaded under control of a clock signal MBIPCK which is generated under three conditions.

1. The system bus request and response control 20-18 acts as a slave and accepts an acknowledge command signal BSACKR or a second half bus cycle command signal BSSHBC from system bus 2.
2. Response control 20-18 detects a 3 microsecond time out during a wrap around test.
3. The SMF 20 acknoweledged itself during a test mode.

The thirty-two output data signals from the input data register 20-16 are applied to comparator 20-20 during the wrap around test mode. The data signals are also applied to a MUX 20-17 for transfer to the data bus 20-52 a byte at a time under microprocessor 20-2 control. The outputs of MUX 20-17 are enabled by signal ENBL2X, whose boolean expression is:

$$A0 \cdot A1 \cdot \overline{A2} \cdot \overline{A3} \cdot \overline{A4} \cdot \overline{A8} \cdot \overline{A9} \cdot A10 \cdot \overline{A11} \cdot \overline{MI} \cdot MREQ$$

The MUX 20-17 selection is made by signals REGSL0, REGSL1 and REGSL2. The boolean expressions are:

$$REGSL0 = (ENBL2X \cdot (A12 \cdot A13 \cdot \overline{A14} + A12 \cdot \overline{A13} \cdot \overline{A15} + A12 \cdot A14 \cdot A15) + ENBL2X \cdot A15) \, RD$$

$$REGSL1 = (ENBL2X \cdot (A12 \cdot \overline{A13} \cdot A14 + A12 \cdot A13) + \overline{ENBL2X} \cdot A14) \, RD$$

$$REGSL2 = (ENBL2X \cdot (\overline{A12} + A12 \cdot A13) + \overline{ENBL2X} \cdot A13) \, RD$$

The four registers making up the input address register 20-36 have their output signals applied to data bus 20-52 under control of signals RDD024, RDD025, RDD026 and RDD027, respectively. The four registers making up the input control register 20-12 have their output signals applied to data bus 20-52 under control of signals RDD020, RDD021, RDD022 and RDD023, respectively. Signal MBIPCK clocks the address signals into register 20-36.

The boolean expression for RDD02X where X varies from 0 to 7 is:

$$ENBL2X \cdot RD \cdot A12 \cdot A13 \cdot A14 \cdot A15 \text{ where binary } A13 \, A14 \, A15 = X$$

The microprocessor 20-2 stores the address bytes, data bytes and command bytes received on the data bus 20-52 into predetermined locations in RAM 20-44 for later action under software control.

The following control signals are used as a part of the commands sent over and received from system bus 2 by SMF 20:

BSYELO (Yellow)

This signal, when true during a second half bus cycle, indicates that the accompanying transferred information has been corrected. It thus designates a soft failure and is taken to mean that perhaps maintenance action should be considered before the failure becomes hard. This signal is used by main memory 10 through 12 on a Read response to indicate an error that was found and corrected.

This signal when true during a memory read request qualifies the read request. The response to BSYELO true during a read request depends on the memory and address involved.

When true during an SMF 20 command to the CSS 3 through 5, BSYELO identifies the SMF 20 command as providing BSMREF indicates that the address leads contain a channel address and a function code.

BSBYTE (Byte)

This signal indicates when true that the current transfer is a byte transfer rather than a word transfer.

BSDBWD (Double Word)

This signal and BSDBPL are used during read requests to indicate how many words of data, and in what format, are expected from main memory 10 through 12. During the read response cycles (from the memory to the requestor), BSDBWD indicates whether or not one or two words of data are on the system bus 2.

On write requests, this signal is used in combination with BSAD23, BSBYTE, and BSDBPL to identify what combination of bytes in a 32-bit operand should be written into memory.

BSDBPL (Double Pull)

This signal is used in conjunction with BSDBWD. During read response cycles, BSDBPL indicates whether the response is not the last or last data element requested.

BSSHBC (Second-Half Bus Cycle)

This signal may either serve to identify the second bus cycle as a response to a read request or as information to set or reset the lock in conjuction with BSLOCK.

BSLOCK (Lock)

This signal indicates when true indicates that this cycle is conditional upon the state of the lock flip-flop in the slave, usually main memory 10 through 12 to indicate that this cycle will either test and set, or reset the lock flip-flop in conjunction with BSSHBC in order to synchronize system processes.

BSWRIT (Bus Write)

This signal indicates when true that this transfer is from master to slave. When this signal is false accompanying a transfer, the master is requesting information from the slave The information when it becomes available will be supplied as a separate transfer.

BSMREF (Memory Reference)

This signal indicates when true that the address leads contain a memory address. When false, this signal indicates that the address leads contain a channel number and a function code.

BSREDL (Red Left)

This signal when true indicates that the accompanying transferred information is in error. This signal is used by memory on Read response to indicate an uncorrectable error in the leftmost word returned words are returned in parallel) or a single word.

BSREDR (Red Right)

This signal when true indicates that the accompanying transferred information is in error. This signal is used by memory on Read response to indicate an uncorrectable error in the rightmost word returned (if two words are returned in parallel).

BSLKNC (Lock: No Memory Cycle)

This signal has significance only during locked memory read requests (BSLOCK true). When true, it instructs the memory to inhibit the actual read operation requested while at the same time allowing the other operations associated with the request to proceed. The response to the request, BSACKR or BSNAKR will be the same whether BSLKNC is true or false, and the setting, clearing and testing of the lock flip-flop in main memory 10 through 12 will be performed. The cycling of the memory module will be inhibited; no second-half bus cycle will occur, and the memory will not go busy.

BSRINT (Resume Interrupting)

This signal is usually issued by the CSS 3 through 5 (and can in some cases be issued by the SMF-20) when it is, again, in a state to receive interrupts. After having been NAKed on one or more prior interrupt requests, the interrupt(s) are "Stacked" in the peripheral controllers 14 through 16. Upon detecting a true transition of BSRINT, those controllers will again attempt to send the interrupt to the CSS 3 through 5 (which may result in another NACK response).

Note that this signal is treated by the receiving controllers 14 through 16 as asynchronous, however, a sender of BSRINT, must be synchronized with a system bus 2 cycle in order to prevent more than one driver source from being active on the system bus 2 at a time in a multiprocessor system.

BSRINT Must be valid for a minimum of 100 nanoseconds and can have anomalous system behavior from 'fuzzy' trailing edge transitions of BSRINT.

BSPWON (Bus Power On)

This asynchronous signal is normally true when all power supplies are in regulation and the internal cabinet termperature is within acceptable operating limits. The signal becomes false when a system (i.e., power control failure, overloading, "Red Level" overtemperature, etc.).

The signal BSPWON is normally generated by the SMF 20 through information provided by the power system 22, but may in some cases be driven by certain communication controllers 20-6 and 20-8 to simulate a system recovery from an up-line host. During a Power-On transition, a positive-going edge of BSPWON indicates that system power has come up and became stable and a system initialization is to take place. Subsequent to initialization a steady power onstate indicates a stable set of system operation conditions. Upon sensing a failure, or Power Off condition, BSPWON will transition to off and all peripheral controllers 14 through 16 must cease all traffic on the bus, and perform a self-initialization in order to enable the CSS 3 through 5 to store the system state and recovery information in main memory 10 through 12 (memory must be non-volatile for Restart conditions). A false going transition of BSPWON must precede the actual loss of DC regulation by a minimum of 3.0 milliseconds and the memory controllers must enter a protected state (no bus cycles accepted) at 2.5 to 3.0 milliseconds after a failure is sensed, to preserve the system state information.

BSACKR (ACK)

The slave signals to the master that it is accepting this transfer by making this signal true.

BSNAKR (NAK)

The slave signals to the master that it is refusing this transfer by making this signal true.

BSWAIT (WAIT)

The slave signals to the master that it is temporarily refusing the tranfer by making this signal true.

BSDCNN (Data Cycle Now)

When true this signal indicates that a specific master is making a system bus 2 transfer and has placed information on the system bus 2 for use by some specific slave. When false, the system bus 2 is idle or between bus cycles.

BSMCLR (Bus Master Clear)

This asynchronous signal is normally false and becomes true when a system condition is detected that requires system operation to be completely aborted and a 'Halt', 'Restart" or 'Reboot" operation is to be performed by the SMF 20. Sources of Master Clear are normally derived from the Power-On sequence and the Control Panel Clear Pushbutton (both SMF 20 originated), but can originate from certain Communication controllers that have the ability to perform a down-line load from an attached host.

When BSMCLR is true, all units on the system bus 2 will initialize. In additon, units that are capable of doing so, will run their QLT's. Successful completion of the QLT's is indicated when the SMF 20 receives the BSQLTA signal.

BSRESQ (Response Qualifier)

This signal will be driven in conjunction with BSACKR, to indicate to the requesting bus master that the slave recognizes the invocation of the functionality, and is responding appropriately. Three types of requests can elect this qualified response:

read requests that may result in a two-word, second-half bus cycle (indicated by BSDBWD—true);

write requests that attempt to write data signals BSDT16 through BSDT31 (indicated by BSDBWD—true); and read requests that attempt to lock or unlock a memory without cycling it (indicated by BSLKNC—true).

System bus request and response control logic 20-18 includes master control logic to gain control of system bus 2 for the SMF 20 and to send the SMF 20 command or response to a command over system bus 2 to the slave unit.

Since the SMF 20 occupies the highest priority position on system bus 2, if SMF 20 requests access to system bus 2, it is granted the next cycle as soon as the present bus cycle is completed. Logic 20-18 will generate signal MYDCNN which is applied to drivers 20-66, 20-62 and 20-72 to put data, address and control information on system bus 2. Logic 20-18 also sends bus signal BSDCNN over system bus 2 to indicate to all subsystems that the system bus 2 is "in use".

Logic 20-18 now awaits any one of a number of responses from system bus 2. The possible responses are:

1. No response is received for 3 us.
2. Wait response is received (BSWAIT).
3. A not acknowledge response is received (BSNAKR).
4. A lock No Cycle (LKNC) is acknowledged (BSLKNC) (BSACKR).
5. A write (one word write or BSRESQ Received) is acknowledged (BSACKR).
6. A write (BSRESQ not received and Double Word) is acknowledged (BSACKR).
7. A READ cycle is acknowledged (BSACKR).

Logic 20-18 will terminate this system bus 2 cycle and again request access to system bus 2 if a BSWAIT or BSNAKR response was received, or if a BSACKR response was received or if a BSACKR response was received for a write double word request.

Logic 20-18 includes slave control logic which is activated when a second half bus cycle is expected in response to a read command sent by SMF 20 to main memory 10 through 12, CSS 3 through 5, or peripheral controllers 14 through 16. Slave control logic is also activated when a bus cycle includes the SMF 20 channel number hexadecimal 0F. The second half bus cycle is accepted by SMF 20 if no error conditions are present and an acknowledge response BSACKR is sent out on the system bus 2 by SMF 20 to the master.

If the second half bus cycle is accepted, then signals from the mode register control the incrementing or decrementing of the output address counter 20-34 depending on the number of data words being transferred as indicated by bus control signal BSDBWD.

SMF 20 will accept an unsolicited command if the channel number is hexadecimal 0F, there are no parity errors, this is not a second half bus cycle (BSSHBC false), bus address signals contain a function code and channel number (BSMREF false) and the function code is legal for the SMF 20. The SMF 20 will respond over system bus 2 with an acknowledge signal BSACKR, a not acknowledge BSNAKR signal or will ignore the command if bad parity or an illegal function code exists.

The ADI 33 interface couples the B channel of the communication controller 20-6 to the auxiliary device 32. This is a standard EIA RS-232C Type Z interface with a data rate of up to 1200 baud. The interface signals are typically transmit data, receive data, data set ready and second request to send.

The CAI 31 interface couples the A channel of the comunication controller 20-8 to the console adapter 30. This interface may be the RS232C asynchronous interface on the RS 422 asynchronous interface. The RS 232C interface signals are transmit data, receive data, clear to send and data set ready. The RS 422 interface signals are transmit data, receive data and data stream control.

The RMO 37 interface couples the A channel of communication controller 20-6 to the remote console 42.

The RMO 37 interfaces with a typical modem 36 as described in the discussion of FIG. 1.

The DTI 29 interface couples the B channel of communication controller 20-8 and matches the CAI 31 interface.

Communication controllers 20-6 and 20-8 are Zilog Z80 SIO/O serial input/output controller described in the aforementioned Zilog gold Book.

Communication controllers 20-6 and 20-8 interrupt microprocessor 20-2 over a common interrupt line. Microprocessor 20-2 responds to the interrupt by sending out the $\overline{MI}$ and IORQ signals as well as signals A14 and A15. The interrupting controller 20-6 or 20-8 responds by sending the status over the data bus 20-58. Microprocessor 20-2 then branches to a software routine based upon the status to process the activity. Typical functions performed by the software by responding to the communications controller 20-6 and 20-8 status signals are, transmit buffer empty, extend status change, receiving character available and special receive condition.

Figure 3:
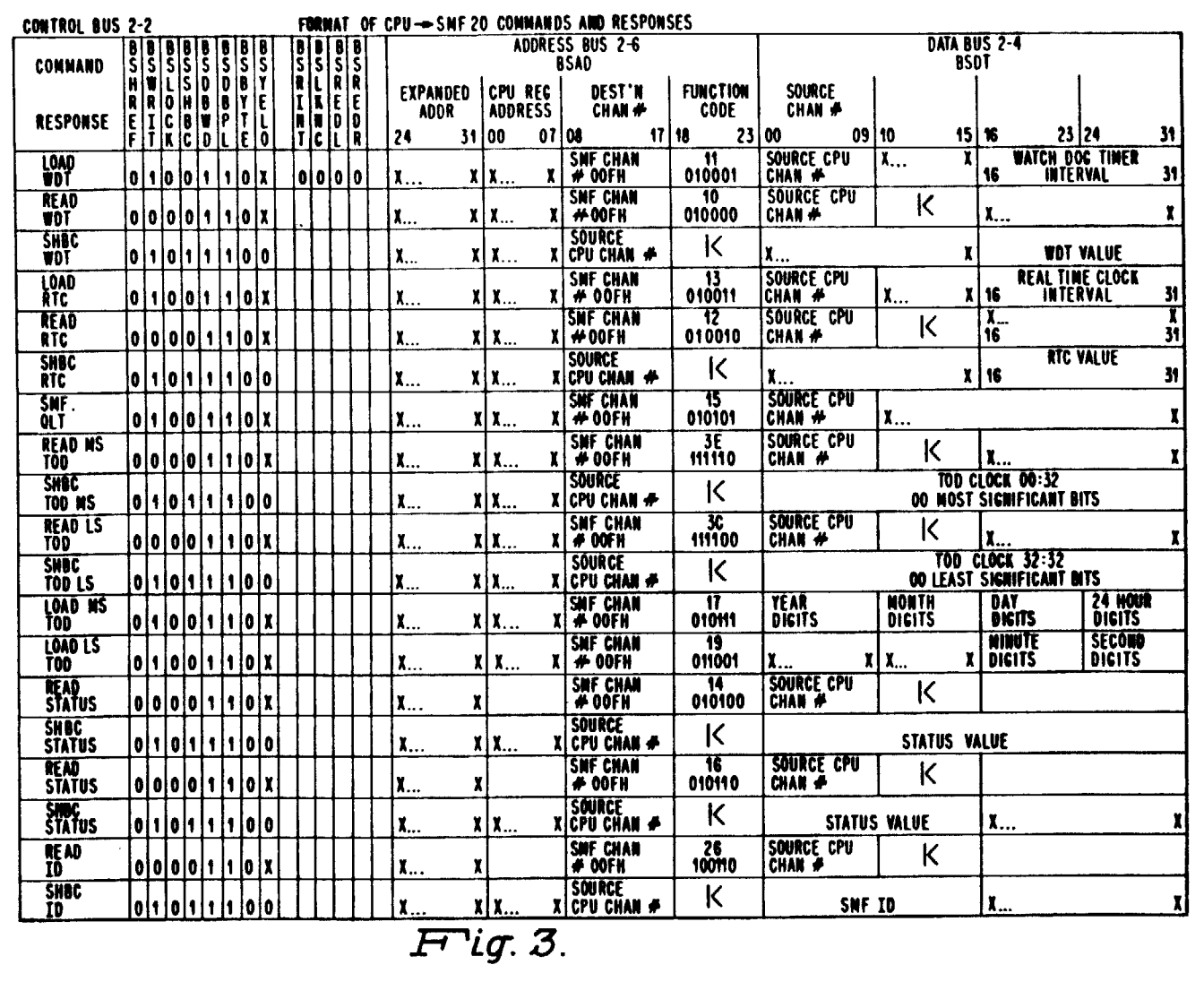

FIG. 3 shows the format of information sent over system bus 2 from CPU 4 through CPU 26 to SMF 20. FIG. 4 shows the format of information sent over system bus 2 from the SMF 20 to CPU 4 through CPU 26. Shown is the information appearing on data bus 2-4, address bus 2-6 and some of the control signals appearing on control bus 2-2.

Referring to FIG. 3, SMF 20 may receive any one of a number of commands from one of the CPU's in CSS 3 through 5, and also receive any one of a number of responses from one of the CPU's in response to a command initiated by SMF 20. In these commands and responses signal BSMREF low indicates that the address signal lines contain a channel number and a function code. Every unit in the DPU 1 system recognizes and responds to its unique channel number. SMF 20 is assigned channel number hexadecimal 0F. Each CPU 4 through CPU 26 is assigned its unique channel number.

Once a unit recognizes its channel number, it sends out a response to acknowledge or not acknowledge the command response. If the unit sends out a BSACKR signal indicating it received the command or response and it acts on it, that is, the unit performs the action designated by the function code.

SMF 20 will receive a load watch dog timer command (LOAD WDT). Address bus 2-6 signals BSAD08-17 contain channel number hexadecimal 0F which is the address of SMF 20. Function code hexadecimal 11, address bus 2-6 signals BSAD18-23 calls for setting the watch dog timer interval designated by data bus 2-4 signals BDT16-31. Data bus 2-4 signals BSDT00-09 identify the channel number of the CPU that initiated the load watch dog timer command. Signal BSWRIT indicates that the load watch dog timer command in system timer 20-32 is a write operation. That is, the watch dog timer value will be loaded into system timer 20-32.

The K in any field represents a constant and has no meaning to the destination unit.

The read watch dog timer command (READ WDT) is identified by function code hexadecimal 10 address bus 2-6 signals BSAD18-23. The READ WDT command was sent by the CPU identified by data bus 2-4 signals, BSDT00-09. In this case, the SMF 20 responds to its channel number hexadecimal 0F, address bus 2-6 signals BSAD08-17, and requests the present contents of the watch dog timer. Signal BSWRIT indicates a read operation.

The second half bus cycle watch dog timer response (SHBC WDT) is sent by the SMF 20 in response to the READ WDT command previously received by the SMF 20 to the CPU identified by the channel number, address bus 2-6 signals BSAD08-17 by SMF 20. Data bus 2-4 signals BSDT16-31 identify the present watch dog timer value sent by the SMF 20. Signal BSSHBC indicates a second half bus cycle operation. Signal BSWRIT indicates a write to system timers 20-32 operation. Note that the source CPU channel number data bus 2-4 signals BSDT00-09 of the READ WDT command is the destination channel number for address bus 2-6 signals BSAD08-17 of the SHBC WDT command.

The load real time clock command (LOAD RTC) function code hexadecimal 13, the read real time clock command (READ RTC), function code 12 and the second half bus cycle real time clock response (SHBC RCT) operate in a similar manner to the watch dog timer commands and response Function code hexadecimal 15 identifies the SMF QLT command and indicates that the SMF 20 should initiate a QLT operation for the CPU initiating the command as indicated by data bus 2-4 signals BSDT00-09.

Function code hexadecimal 3E identifies te Read Upper Half Time of Day Command (READ MS TOD) and indicates that the requesting CPU data bus 2-4 signals BSDT00-09 is calling for the contents of the most significant digits of the time of day clock in system timers 20-32.

The SHBC TOD MS response by SMF 20 to the READ MS TOD command sends the most significant digits of the time of day clock as indicated by data bus 2-4 signal BSDT00-31 to the requesting CPU.

The read least significant time of day command (READ LSTOD), function code hexadecimal 3C requests the least significant digits of the time of day clock be sent to the source channel number CPU.

The SHBC TOD LS responds by sending the least significant digits of the time of day clock data bus 2-4 signals BSDT00-31 to the requesting CPU.

Function code hexadecimal 17 identifies the load most significant time of day clock command (LOAD MS TOD) which indicates that the SMF 20 is receiving the year, month, day and hour digits via data bus 2-4 signals, BSDT 00-31 for storage in system timers 20-32. Function code hexadecimal 19 identifies the load least significant time of day command (LOAD LS TOD) and results in the SFM 20 receiving the minute and seconds digits via data signals BSDT 16-31 for updating the time of day in the system timers 20-32.

A read status command function code 14 requests the contents of 32 bits of the status register which is sent back to the requesting CPU via an SHBC status response by data bus 2-4 signal BSDT 00-31. Function code 16 requests the status of the first 16 bits of the 32 bits of the status register which is sent back via data signals BSDT 00-15 during the SHBC status response. The status register contains 32 bits in 4 locations of RAM 20-44.

Signals BSDT 00-15 gives the status of the power, temperature, and which CPU's are present and active. Signals BSDT 16-31 gives an indication of any failures found during the Quality Logic Test (QLT).

Function code hexadecimal 26 calling for a read identification command (READ ID) addressed to the SMF 20 indicates that one of the CPU's is requesting the identification code of SMF 20. The SMF 20 will return the SMF 20 identification code hexadecimal XXXX over data bus 2-4 signals BSDT00-15 during an SHBC ID response. The requesting CPU by the identification code received will have a record of the configuration of the particular SMF 20 coupled to system bus 2.

FIG. 4 identifies the commands that SMF 20 sends to CPU 4 through CPU 26. The special commands issued by the SMF 20 have top priority. Signal BSYELO high and signal BSMREF low are generated by SMF 20 and placed on the system bus 2 to indicate that this is an SMF 20 generated special command. SMF 20 also generates the standard read/write main memory 10 through 12 and controllers 14 through 16 commands.

The CPU QLT command identified by function code hexadecimal 27 is sent to the CPU having the channel number identified by address bus 2-6 signals BSAD 08-17 to perform a QLT test. Data bus 2-4 signals BSDT 00-09 identify the SMF 20 as the source of the command by sending the channel number hexadecimal 0F.

The stop CPU command is initiated by a depression of the STOP key on display console 34 or if in a remote maintenance mode, remote console 42 for each active CPU in turn. Address bus 2-6 signals BSAD 08-17 identify the channel number of all active CPU's. These active CPU's will stop executing instructions when they receive the stop CPU command, function code hexadecimal 23. The step CPU command as indicated by function code hexadecimal 29 puts the addressed CPU identified by channel number address bus 2-6 signals BSAD 08-17 in the one step mode. The addessed CPU will execute one instruction for each depression of the Execute key on either the display console 34 or remote console 42 if the SMF 20 is in the remote maintenance mode.

The Run CPU command as identified by function code hexadecimal 20 causes all active CPU's identified by channel number address bus 2-6 signals BSAD08-17 to execute in the run mode by skipping over any halt instructions.

An operator may enter data into any CPU register by generating a WRC PRG command identified by function code hexadecimal 2B. The data bus 2-4 signals BSDT 00-31 are written into a selected register designated by address bus 2-6 signals BSAD00-07 at a CPU identified by its channel number address bus 2-6 signals BSAD 08-17.

A change command identified by function code hexadecimal 25 allows an operator to change two hexadecimal digits in the selected CPU register by sending the hexadecimal digits by data bus 2-4 signals BSDT 24-31.

The RDC PRG command is operator generated and indicates by function code hexadecimal 20 that the addressed CPU address bus 2-6 signals BSAD 08-17 send the contents of the addressed CPU register address bus 2-6 signals BSAD 00-07 to the SMF 20 having a channel number hexadecimal 0F as indicated by data bus 2-4 signals BSDT 00-09.

The addressed CPU sends back the contents of the addressed register over data bus 2-4 signals BSDT 00-31 to the SMF 20 identifed by the channel number BSAD 08-17 by the SHBC READ RG response during the second half bus cycle identified by signal BSSHBC. Also, address bus 2-6 signal BSAD 22 if set indicates that the designated CPU is in a halt mode and address bus 2-6 signal BSAD 21 set indicates that the designated CPU was halted by the operator. Note that this is a CPU generated second half bus cycle so that the state of signal BSYELO is immaterial.

The real time clock interrupt (RTC INT) command, function code hexadecimal 2F indicates to the CPU channel number address bus 2-6 signals BSAD 08-17 that loaded the real time clock in the system timer 20-32 that the timer counted down past zero. The designated CPU will take appropriate action. Note that the source channel number of the SMF 20 is shown as hexadecimal 03CO as indicated by data bus 2-4 signals BSDT00-15. However, signals BSDT00-09 indicate hexadecimal 0F.

The watch dog timer interrupt (WDT INT) command function code hexadecimal 31 indicates to the CPU channel number address bus 2-6 signals BSAD 07-17 that loaded the watch dog timer in the sytem timer 20-32 that the timer counted down past zero and the designated CPU will take appropriate action.

The status change command function code hexadecimal 33 indicates to all active CPU's that one or more conditions exist, namely power failure (PF), a temperature yellow error (TY), or a power yellow error (PY) as indicated by data bus 2-4 signals BSDT 00, BSDT 01 and BSDT 02, respectively. Also signals BSDT12 through BSDT15 identify the active CPU's.

When power system 22 indicates over the power control interface 21 via signal SYSPWN that power is failing, the status change command sends the RF bit to all active CPU's. All active CPU's will manage an orderly shut down in three milliseconds.

When power supply 22 indicates, over the PCI 21 interface via signal PWRYLO, that there was a change in the status of the power system 22 to power yellow, then the active CPU's are notified in order to inform the operating system to take appropriate action which may be to ignore, or to shut down, or alert maintenance personnel.

The SMF 20 temperature sensing device 20-40 indicates when the maximum ambient temperature is reached, temperature yellow. All active CPU's are notified to enable the operating system to take whatever action was programmed, that is, to ignore, to shut down, or alert maintenance personnel.

The no-op off-line command, function code hexadecimal 21, takes the designated CPU, channel number address bus 2-6 signals BSAD 08-17 off line until the SMF 20 clears the syndrome register of the designated CPU.

The 32 bit syndrome register (not shown) stores DPU 1 system status information relating to main memory 10 through 12, peripheral controllers 14 throughh 16, CSS 3 through 5, and system bus 2.

The SMF to CP interrupt command, function code hexadecimal 3F, interrupts the designated CPU, channel number address bus 2-6 signals BSAD08-17, during a QLT operation to perform the function specified by address signals BSAD 00-07. These functions flush various portions of the content addressable memory in the designated CPU.

Figure 5:
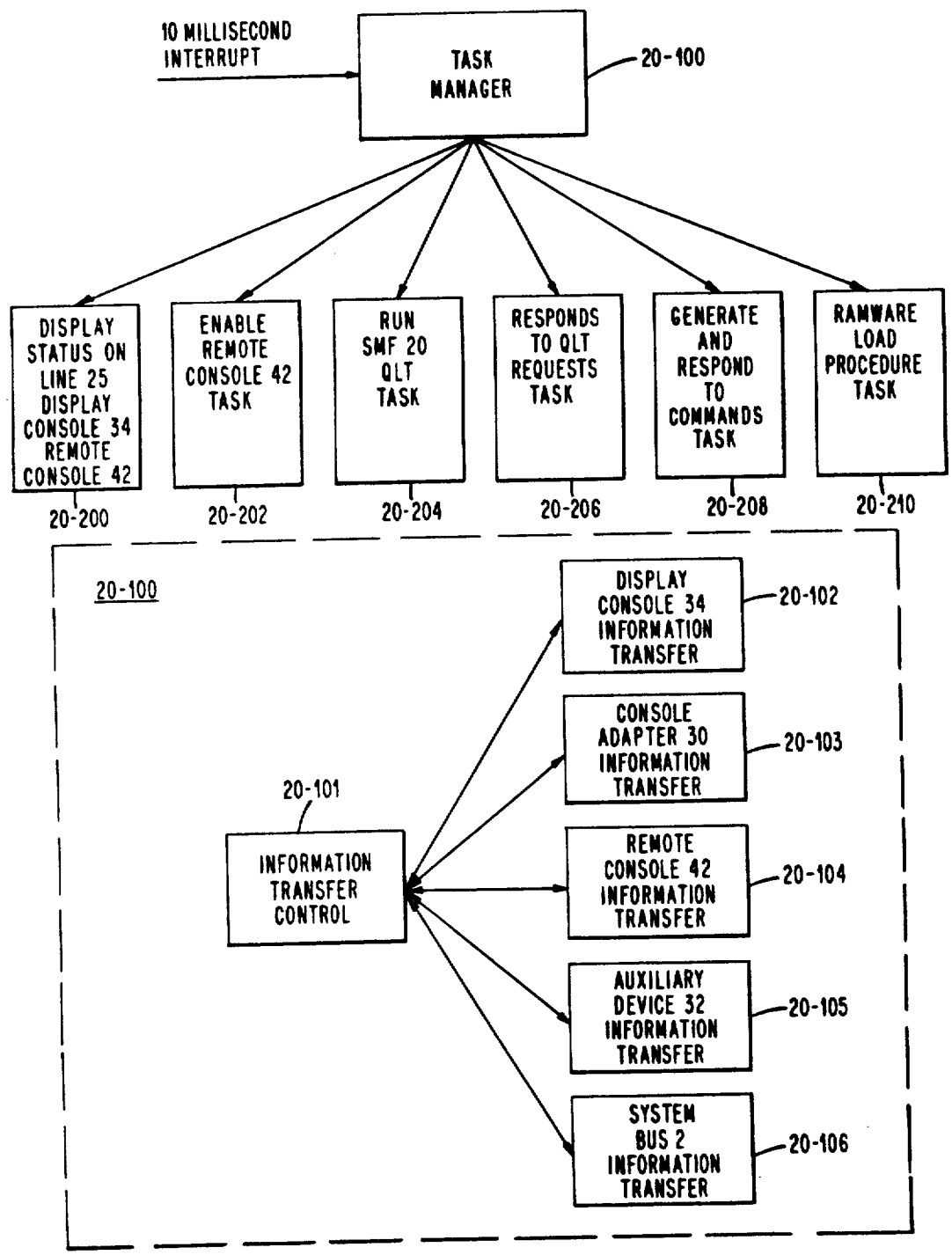
FIG. 5 shows a software block diagram of the control of the centralized resources in the system management facility.

FIG. 5 is a block diagram of the overall software operation of the SMF 20 which is executed by microprocessor 20-2 A task manager 20-100 executes a number of software routines in sequence. The task manager 20-100 schedules the next task for execution every ten milliseconds. System timers 20-32 generates an interrupt signal every ten milliseconds. The microprocessor 20-2 responds to the interrupt and queries the system timers 20-32 for control information which is sent to the microprocessor 20-2 via data bus 20-52 Microprocessor 20-2 generates an address which contains a pointer which points to that particular interrupt handling routine. After the routine is executed, the microprocessor 20-2 returns to the point from which it came.

A software routine 20-200 displays the SMF 20 status on line 25, which corresponds to the bottom line of the CRT display on the display console 34, remote console 42 and is also pointed out by auxiliary device 32. The information displayed includes:

SMF 20 status, states and mode information;
DPU 1 system control panel information;
maintenance mode information; and
SMF 20 commands and messages.

The SMF 20 status information includes an indication of which CPU is originating the information displayed on line 25 and states whether the information displayed indicates a command error, console mode panel mode or maintenance mode and CPU selected register displays.

The control panel information includes the contents of selected CPU registers, indicates that all active CPU's are executing an instruction, indicates if the DPU 1 system is in a memory read or memory write state and indicates if the selected CSS 3 through 5 is in a STEP/START mode.

The panel maintenance and console K mode information includes indications of errors during QLT operation, indications of unrecoverable errors by CSS 3 through 5 when interrogated by the SMF 20, and indications of software error or hardware error halt states. Also, the contents of CSS 3 through 5 registers may be displayed under operator control The SMF 20 commands are available to the operator to enable and disable the remote console 42, enable the panel maintenance and console K modes, enable and disable any CPU, change or modify parameters such as channel number and password. Line 25 is optionally displayed in the console K mode by depressing the control key and striking the K key of the keyboard.

The operators may also display specific messages including the state of the remote connection and mode transitions.

Software routine 20-202 is activated by the remote console 42. During attended operation, the remote operator calls the systems operator and establishes voice contact. The firware task 20-202 takes over when the system and remote operators put their respective modem 36 and modem 38 in the data mode. The system operator enters the enable remote command via display console 34. This initiates the data terminal ready and request to send signals by the SMF 20 to start the data transfer Once the password sent by the remote console 42 is compared and is equal to the password stored in PROM 20-46, then the remote console 42 is connected. Depressing a predetermined control key enables the remote console 42 active and the display console 34 inactive.

In the unattended mode the SMF 20 senses a ring, signal from data modem 36, generates the data terminal ready and request to send signals, receives and checks and the password and places the remote console 42 in the active mode, as above.

Software block 20-204 executes an SMF 20 self test QLT task each time it is initiated by the task manager 20-100.

These include displaying information on the display console 34 or remote console 42, such as error conditions found, and a number of warning indications such as temperature yellow, power yellow, power up error or a system bus 2 failure.

Software block 20-206 processes unsolicited QLT interrupts from the QLT software resident in one of the CPU's. Typically, requests are to display QLT information on the CRT of display console 34. Another request may initialize a cache unit.

Software block 20-208 responds to all commands received from the operator who can change the mode can enable or disable the remote console 42 and selects which CPU register is to be displayed.

Block 20-210 is invoked by block 20-204 when the QLT task needs CPU functionality to continue the QLT testing of the CPU's. At that time, block 20-210 is activated. After the CPU functionality is loaded, block 20-204 is activated and the CPU QLT runs under control of the SMF 20.

At any time, the task manager 20-100 will interrupt the normal processing by software blocks 20-200 through 20-210 to process a data word.

Microprocessor 20-2 is interrupted by an interrupt signal applied to its INT input terminal. Microprocessor 20-2 generates the MI and IORQ signals which are received by the interrupting device which may be communication controller 20-6 or 20-8, or one of the timers of system timers 20-32. The interrupting device responds to the $\overline{MI}$ and IORQ signals by sending out status information over data bus 20-58. Typical of the status information could be transmit buffer empty or receive character available. Microprocessor 20-2 may send address signals out on address bus 20-54 to address a location in RAM 20-44 of a next character to be transitted or for storing the character received. Certain other status information is available to microprocessor 20-2 including cyclic redundancy check (CRC) error status information, number of bits per character and asynchronous mode and synchronous mode information.

The task manager 20-100 includes a software block 20-101 to buffer the data being transferred from SMF 20 to either the display console 34, or remote console 42, or the auxiliary device 32. Software block 20-102 processes the display console 34 data transfer between the B channel of communications controller 20-8 and RAM 20-44. Software block 20-103 processes the console adapter 30 data transfer between the A channel of communications controller 20-8 and RAM 20-44. Software block 20-104 processes the remote console 42 data transfer between the A channel of communications controller 20-6 and RAM 20-44. Software block 20-105 processes the auxiliary device 32 data transfer from RAM 20-44 to the B channel of communication controller 20-6. Software block 20-106 initiates a command over system bus 2 when either the watch dog timer or real time clock counts down to zero. Other commands are to load and read the watch dog timer, real time clock and time of day clock. Microprocessor 20-2 reponds to an interrupt from system timers 20-32 to request the status word indicating the kind of time out. Microprocessor 20-2 loads the output registers 20-10, 20-14, and 20-34 with the information of the RTC INT or WDT INT commands of FIG. 4 and requests the system bus 2 cycle via system bus request and response logic 20-18. If the CPU is busy, the response is queued up and the task manager 20-100 checks if any commands are in the queue when invoked.

While the invention has been shown and described with reference to the preferred embodiment thereof, it will be understood by those skilled in the art that the above and other changes in form and detail may be made therein without departing from the spirit and scope of the invention.

What is claimed is:

1. A method for initializing and controlling a data processing system by a system management facility, said data processing system having a number of subsystems which includes a main memory, said system management facility and said subsystems being coupled in common to a system bus, said system management facility having the highest priority on said system bus, the method comprising the steps of:

testing and verifying that power applied to said data processing system is within operational limits;

testing and verifying that said system management facility is operational;

testing and verifying that said system bus is operational;

loading booting and quality logic testing software into said main memory for execution by said subsystems to boot and test the subsystems;

executing said booting and quality logic testing software by said subsystems and reporting to the system management facility whether or not each of the subsystems is operational;

receiving one of a number of different types of timing information from at least one of said subsystems by said system management facility and initializing one of a plurality of timing means with said timing information, said plurality of timing means comprising a number of different types of timing means, wherein each of said number of different types of timing information is used to initialize a corresponding one of said different type of timing means;

transmitting to at least one of said subsystems one of a number of different interrupt signals when said one of said plurality of timing means has timed out, each of said number of different interrupt signals corresponding to a time out by one of said number of different types of timing means;

wherein if the system management facility attempts to place signals on said system bus at substantially the same time as at least one of said subsystems, the system management facility, having the highest bus priority, shall be given control of said system bus.

2. A system management apparatus for a data processing system having a number of subsystems coupled in common to a system bus, said system management apparatus comprising:

a bus interface device coupling said system management apparatus to said system bus on a highest priority basis;

a number of shared resource means, said number of shared resource means comprising:

means for powering said subsystems, means for determining a condition of power supplied by said powering means and generating signals representative of said condition of said power, means for determining a temperature inside a housing which houses said data processing system and generating signals representative of said temperature, means for initializing said subsystems, means for testing each subsystem and said system management apparatus, and a plurality of timing means for providing centralized timing functions for said subsystems based on different information inputted to different ones of said plurality of timing means from said subsystems and for generating respective interrupt signals based on said inputted information, each said respective interrupt signal signalling that a time out corresponding to the respective timing means has occurred; and processing means, coupled to each of said number of shared resource means and to said bus interface device, for controlling said system management apparatus, said processing means comprising:

means for determining whether said temperature and said condition of said power are acceptable for data processing system initialization, means for generating status signals for said subsystems indicative of the status of said shared resource means and placing said status signals on said system bus through said bus interface device, wherein said bus interface device, having said highest priority, will have control of said system bus means if at least one of said number of subsystems attempts to place signals on said system bus at substantially the same time as said bus interface device, means for receiving request signals from said subsystems through said system bus and said bus interface device, said request signals from said subsystems including requests for the status of said shared resource means and timing information for use by said timing means, and means for initializing said subsystems when said temperature and said power conditions are acceptable.

3. The system management apparatus of claim 2 wherein the timing means comprises:

watch dog timer means for protecting said data processing system against software malfunctions, said watch dog timer means comprising:

means for storing a predetermined time, said predetermined time being sent by one of said subsystems to said system management apparatus, means for decrementing said predetermined time in said storing means, means for determining if said decremented predetermined time has reached a predetermined value, and means for generating a watch dog timer interrupt signal if said decremented predetermined time has reached said predetermined value, wherein said processing means places said watch dog timer interrupt signal on said system bus through said bus interface means to alert said subsystems that a software malfunction may have occurred in said data processing system.

4. The system management apparatus of claim 2 wherein the timing means comprises:

real time clock means for alerting a subsystem to start processing a new process, said real time clock means comprising:

means for storing a predetermined time, said predetermined time being sent by one of said subsystems to said system management apparatus, means for decrementing said predetermined time in said storing means, means for determining if said decremented predetermined time has reached a predetermined value, and means for generating a real time clock interrupt signal if said decremented predetermined time has reached said predetermined value, wherein said processing means places said real time clock interrupt signal on said system bus through said bus interface means to alert said one of said subsystems.

5. The system management apparatus of claim 2 wherein the means for testing comprises:

quality logic test means for testing and verifying the operational condition of said subsystems, said quality logic test means comprising:

means for transferring boot and quality logic test programs from a storage means coupled to said system bus to a main memory coupled to said system bus;

means for initiating execution of said boot and quality logic test programs by each of said subsystems, and means for receiving verification signals from each of said subsystems indicating the operational state of said subsystems, said operational state being determined by the execution of the quality logic test programs by each of said subsystems.

6. The apparatus of claim 2 wherein said bus interface means comprises:

output register means for storing information bus signals;

bus request means for requesting access to said system bus;

bus access means for granting access to said system bus when said system bus is not busy; and system bus driver means coupled to said output register means, said bus access means and said system bus for receiving said information bus signals for transfer over said system bus.

7. The apparatus of claim 6 wherein said output register means comprises:

output address register means for storing a plurality of address signals;

output control register means for storing a plurality of control signals including a first control signal indicating that said bus signals represent a command from said systems management apparatus, and a second control signal indicating that said address signals identify the subsystem to receive said information bus signals and an operation to be performed by said subsystem.

8. The apparatus of claim 7 wherein said output register means further includes:

output data register means for storing a plurality of data signals identifying said system management apparatus as the source of said bus signals.

9. The apparatus of claim 8 wherein said processing means comprises:

a local data bus;

a local address bus;

microprocessor means for generating a plurality of microprocessor control signals, generating a plurality of local address signals over said local address bus and generating and receiving a plurality of local data signals over said local data bus; and address decode means for receiving said microprocessor control signals and said local address signals over said local address bus and generating a plurality of local control signals for controlling the operation of said apparatus.

10. The apparatus of claim 9 wherein said microprocessor means being responsive to interrupt signals from said timing means for generating said microprocessor control signals, said timing means including first and second counters, said timing means being responsive to said microprocessor control signals for generating first status signals over said local data bus indicating that said first counter of said timing means reached a predetermined value, and generating second status signals over said local data bus indicating that said second counter of said timing means reached said predetermined value;

said microprocessor means being responsive to said first status signals for generating a first plurality of said local address signals over said local address bus, and being responsive to said second status signals for generating a plurality of said local data signals over said local data bus, said plurality of said local data signals being indicative of said bus signals, said address decode means responsive to said first plurality of said local address signals and said microprocessor control signals for generating said plurality of logic control signals;

said output register means being responsive to said plurality of logic control signals for storing said plurality of said logic data signals received from said local data bus for subsequent transfer over said system bus as said system bus signals; and wherein said bus signals represent a first command including a first channel number identifying said subsystem and a first function code as identifying said first counter as having read out said predetermined value, and said bus signals representing a second command including a second channel number identifying said subsystem and a second function code as identifying said second counter as having read out said predetermined value.

11. The apparatus of claim 10 wherein said predetermined value is ZERO.

12. The apparatus of claim 10 wherein said first counter is a watch dog timer and said second counter is a real time clock.

13. The apparatus of claim 10 wherein said first and said second commands are coded to designate the same destination subsystem.

14. The apparatus of claim 10 wherein said first and said second commands are coded to designate different destination subsystems.

15. The apparatus of claim 9 wherein said microprocessor means periodically generates a second plurality of said local address signals;

said address decode means responsive to said second plurality of said local address signals for generating a plurality of multiplexer control signals; and multiplexer means coupled to said power condition determining means and to said temperature determining means responsive to said plurality of multiplexer condition signals for transferring said power control signals and said temperature signals to said processing means via said local data bus.

16. The apparatus of claim 15 wherein said microprocessor means is responsive to said power condition signals and said temperature signals for generating a third plurality of said local address signals and said plurality of local data signals, said plurality of data signals including a power failure signal when said power condition signals indicate a power failure, a power alert signal when said power condition signals indicate a power alert, and a temperature high signal when said temperature signals indicate that the temperature has reached a predetermined temperature.

17. The apparatus of claim 16 wherein said address decode means in response to said third plurality of said local address signals and said microprocessor control signals generates said plurality of local control signals;

said output register means in response to local control signals storing said plurality of said local data signals for subsequent transfer over said system bus;

said local data signals corresponding to a third command including a third channel number of a first active subsystem, a third function code identifying said third command as a status change command, a first system bus data signal corresponding to said power failure signal, a second system bus data signal corresponding to said power alert signal and a third system bus data signal corresponding to said temperature high signal.

18. The apparatus of claim 19 wherein said microprocessor means initiates the transfer of said status change command for transfer over said system bus to other active subsystems.

19. The apparatus of claim 18 wherein said shared resource means further includes a Quality Logic Test (QLT) means, said QLT means comprising:

self test means for testing said apparatus and generating a first QLT signal indicating that said apparatus is operational.

20. The apparatus of claim 19 wherein said QLT means further comprises:

wraparound test means including comparator means for verifying said system bus and that said apparatus may gain access to said system bus.

21. The apparatus of claim 20 wherein said QLT means further comprises:

QLT read only memory means for transferring QLT test routines to a main memory subsystem associated with said subsystems;

subsystem functionality software memory means for storing and transferring subsystem function routines to a said subsystem, executing said subsystem function routines providing functionality to said subsystem;

CPU QLT command means for providing CPU QLT commands to said subsystem via said system bus for initiating said subsystem QLT test by said subsystem executing said QLT test routines under control of said executing subsystem function routines, said apparatus receiving a second QLT signal from said subsystem via said system bus indicating that said subsystem is operational.

* * * * *